(12) United States Patent
Sharma et al.

(10) Patent No.: US 11,145,092 B2
(45) Date of Patent: Oct. 12, 2021

(54) GRAPHICAL ELEMENT COLOR DIFFUSION TECHNIQUES

(71) Applicant: Adobe Inc., San Jose, CA (US)

(72) Inventors: Avadhesh Kumar Sharma, Jhunjhunu (IN); Arzoo Kashyap, Noida (IN)

(73) Assignee: Adobe Inc., San Jose, CA (US)

( * ) Notice: Subject to any disclaimer, the term of this patent is extended or adjusted under 35 U.S.C. 154(b) by 33 days.

(21) Appl. No.: 16/058,748

(22) Filed: Aug. 8, 2018

(65) Prior Publication Data

US 2020/0051289 A1 Feb. 13, 2020

(51) Int. Cl.
| | |
|---|---|
| *G06T 11/00* | (2006.01) |
| *G06T 7/90* | (2017.01) |
| *G06F 17/13* | (2006.01) |
| *G06F 40/20* | (2020.01) |
| *G06F 40/103* | (2020.01) |

(52) U.S. Cl.
CPC ............ *G06T 11/001* (2013.01); *G06F 17/13* (2013.01); *G06F 40/103* (2020.01); *G06F 40/20* (2020.01); *G06T 7/90* (2017.01)

(58) Field of Classification Search
None
See application file for complete search history.

(56) References Cited

U.S. PATENT DOCUMENTS

| | | | |
|---|---|---|---|
| 2013/0127856 A1* | 5/2013 | Winnemoeller | G06T 17/20 345/423 |
| 2015/0193950 A1* | 7/2015 | Smolic | G06T 11/001 345/589 |
| 2019/0266788 A1* | 8/2019 | Huynh-Thu | G06T 15/405 |

OTHER PUBLICATIONS

Planet Photoshop, "Inflated Text Using 3D in Photoshop CC", Jul. 2, 2014 (Year: 2014).*
Textuts, "Crumpled Paper Textured 3D Text Effect In Photoshop CS5—Part 1", posted on May 7, 2011, In 3D Photoshop Text Effect Tutorials, Advanced Photoshop Text Effect Tutorials (Year: 2011).*
Rose "How to Create a 3D Stuffed Letters Text Effect in Adobe Photoshop", posted on Apr. 25, 2017, https://design.tutsplus.com/tutorials/3d-stuffed-letters-text-effect--cms-28438 (Year: 2017).*
Planetphotoshop, "3D Bold Text Effect"; posted on Apr. 23, 2013, https://planetphotoshop.com/3d-bold-text-effect.html (Year: 2013).*

(Continued)

*Primary Examiner* — Sarah Le
(74) *Attorney, Agent, or Firm* — FIG. 1 Patents

(57) ABSTRACT

Rich color diffusion techniques applied to text as part of digital content creation by a graphics rendering application of a computing device are described. The graphics rendering application is configured to receive color location data and color identification data with respect to a graphical element, diffuse colors within the boundary of the graphical element based on the color location data, color identification data, and a mesh generation algorithm, and automatically replicate the diffused color pattern onto subsequently selected graphical elements. Techniques are also described that facilitate storing a plurality of graphical element properties associated each of the graphical elements and changing one or more of the stored properties before, during, and after color diffusion of the graphical elements.

20 Claims, 17 Drawing Sheets
(12 of 17 Drawing Sheet(s) Filed in Color)

(56) References Cited

OTHER PUBLICATIONS

Mapline, "How to Create a Color-Coded Map"; posted Aug. 19, 2015, (https://mapline.com/customize-territory-color-coded-maps/) (Year: 2015).*

* cited by examiner

300

302
Receive first color location data identifying a first location with respect to a first graphical element and first color identification data associating a first color with the first location

304
Diffuse the first color within the first graphical element based on the first location

306
Receive a user input selecting a second graphical element

308
Diffuse, automatically and without user intervention, the first color within the second graphical element based on the first location as defined by the first color location data and the first color identification data

310
Display the first and second graphical elements having the diffused color

*Fig. 3*

GRAPHICAL ELEMENT COLOR DIFFUSION TECHNIQUES

BACKGROUND

Graphics rendering applications as executed by a computing device include a variety of color application tools. These tools support content creator interaction, via a user interface, to apply colors to digital content such as digital images, vector graphics, text, and various path objects. Examples of such tools include the fill color and stroke color tools, each of which applies colors to shapes in digital content in specific ways. The fill color tool applies colors within the borders of shapes, while the stoke color tool applies colors on or along shape borders.

In addition, graphics rendering applications include color application tools having additional complexity, such as axial (i.e. linear) or radial color gradients, which enable content creators to apply colors in unique and creative ways. Color gradients are typically accessed via gradient panels included in graphics rendering applications. These panels include a range of colors with a series of markers placed at select locations along the range, with each marker indicating a color change. Additionally, the area between the markers contains color ranges including darker and lighter shades of colors in predefined gradations.

Users may select a color gradient from this range (i.e. color spectrum) and apply it "axially" or "radially" to various shapes in digital content to achieve a color diffused effect. An axial color gradient is applied to colors at two specified points. A radial gradient is used to apply one or more colors at the center of a circle and another color at the circle's edge, thereby creating an appearance of the center color progressing radially outward in the direction of the circle's edge. These tools, however, limit user creativity and are inefficient because these tools do not allow for the application of colors to digital content based on the content's topology or shape, such as text.

SUMMARY

A digital coloring tool is described that is configured for implementation via a computing device to create graphical elements (e.g., text) to have a rich color diffused appearance. The digital coloring tool as implemented by the computing device as described herein is configured to receive data specifying a location selected within a boundary of a graphical element such as text and a color to be applied to the selected location. Thereafter, the coloring tool is implemented by the computing device to generate vertices at predefined areas within the boundary of the text based on the selected location and apply the selected color at these vertices according to a color weighting calculation. Additional colors may also be applied to vertices created based on the selection of one or more additional locations within the boundary of the text. In sum, the application of one or more colors to the vertices created by the selection of one or more locations within the text creates a color diffused appearance. The coloring tool described herein also enables content creators to change a plurality of text character properties before and after the color diffusion of text. As such, the text remains "live" as supporting additional modifications. Moreover, the color diffused appearance of text and changes to one or more of the text properties may be automatically applied to other selected text and thus is repeatable, thereby increasing user and computational efficiency. In this way, the digital coloring tool described herein overcomes the limitations of conventional techniques, which cannot create graphical elements such as text with a rich color diffused appearance.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The detailed description is described with reference to the accompanying figures. Entities represented in the figures may be indicative of one or more entities and thus reference may be made interchangeably to single or plural forms of the entities in the discussion.

FIG. 3 is a flow diagram depicting a procedure in an example implementation of diffusing colors within text in a graphical element rendering environment.

DETAILED DESCRIPTION

Overview

Figure 1:
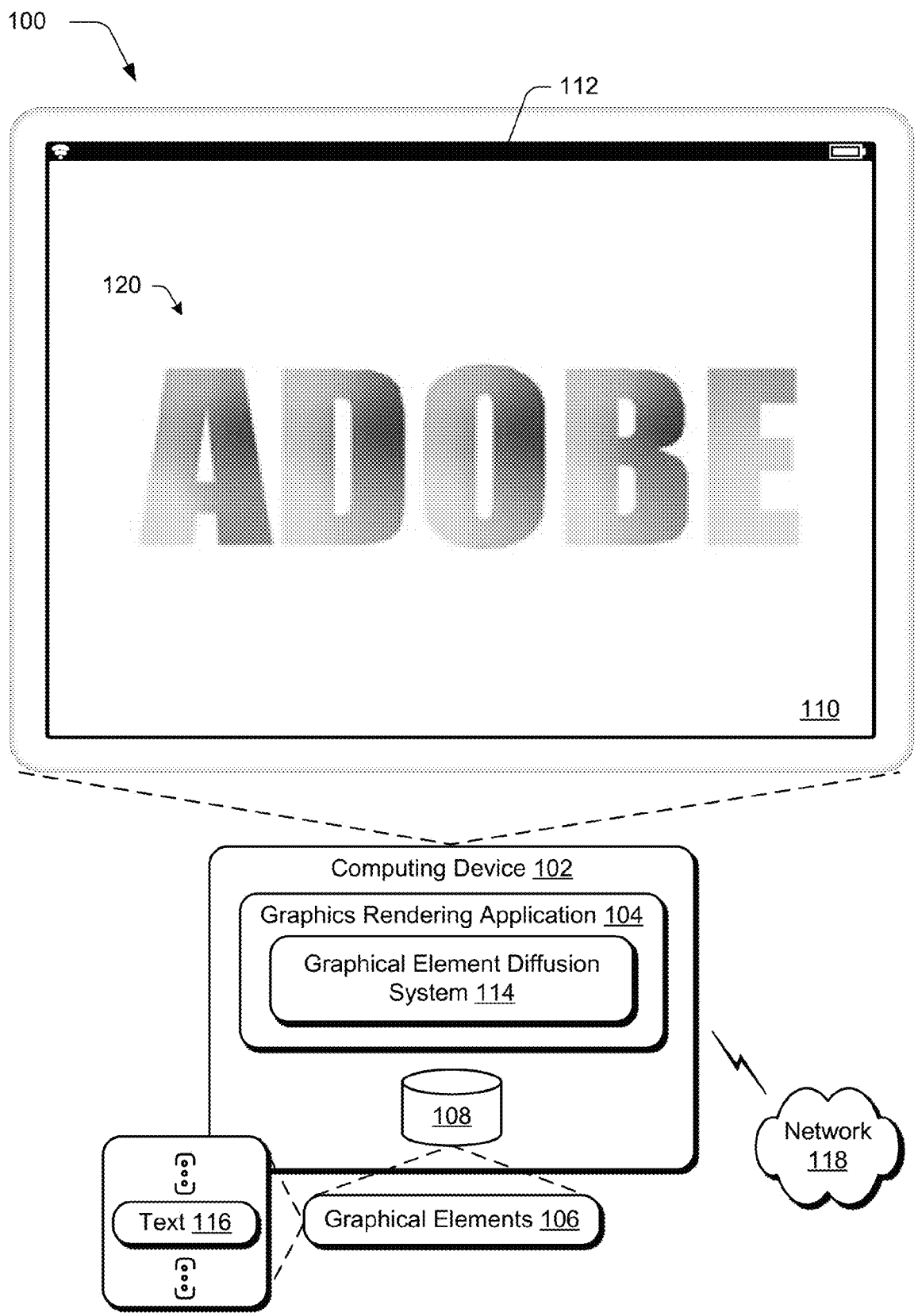
FIG. 1 is an illustration of a graphical element rendering environment in an example implementation that is operable to create graphical elements such as text to have a rich color diffused appearance.

One of the challenges in digital content creation by a graphics rendering application is diffusing various digital content shapes with colors or color combinations to give the shapes a richly colored appearance. Conventional color diffusion techniques, however, are ineffective because these techniques are not capable of addressing a topography that is specific to various compound shapes in digital content. As such, conventional techniques significantly limit the type of shapes that support diffusion of intricate color combinations, thereby hindering the ability of users to create richly colored digital content with the use of a computing device, especially for graphical elements such as text. The inability of users to create such content is both user and computationally inefficient.

Accordingly, a graphics rendering application is described that is configured to support color diffusion techniques that are applicable to graphical elements such as text by addressing a topography within a boundary of the graphical elements. In one example, a color input module of the graphics rendering application receives user inputs specifying a location within a boundary of a graphical element and a color to be diffused from that location. From this, a mesh having a plurality of nodes is generated by a mesh generation module of the graphics rendering application. The plurality of nodes are weighted by a color generation module of the graphics rendering application to diffuse color from the specified location within the boundary of the graphical element. Specifically, the color generation module applies one or more colors to select portions (i.e. vertices) of the mesh according to a color weighting calculation. The resulting effect is a graphical element with a rich color diffused appearance that addresses the topology of the graphical element and thus is applicable to items such as text that are not supported by conventional techniques.

Furthermore, the color diffused appearance of a graphical element is repeatable, automatically and without user intervention, by the graphics rendering application onto subsequently selected graphical elements. The replication process may involve a variety of mapping methodologies, which trace and store color location data identifying one or more locations within the boundary of the graphical element where one or more colors are diffused, and map these locations onto the outline of subsequently selected graphical elements. These newly mapped locations are then diffused with one or more colors. As a result, subsequently selected graphical elements have a color diffused appearance similar or identical to the originally diffused element, and thus support a visually consistent appearance across multiple graphical elements. One advantage of these mapping methodologies is that because the replication is automatic and occurs in real time by the graphics rendering application, users are saved from being forced to manually identify color location data and color identification repeatedly for each of the subsequently selected graphical elements. Consequently, operating efficiency of the computing device is improved and the time needed to create digital content with a rich color diffused appearance is reduced.

In another example, the graphics rendering application described herein also supports a change in properties associated with graphical elements before and after color diffusion, and thus supports "live" graphical elements. These properties may relate to a variety of different ways in which the appearance of graphical elements may be altered. This result is a significant increase in users' ability to render digital content with a detailed and customized appearance. Another advantage of the graphics rendering application described herein is that users can apply rich color diffused appearance in a precise manner to a larger range of digital content shapes, providing creative flexibility in digital content creation. Further, the graphical elements rendered by the graphics rendering application are compatible with a variety of standards. Specifically, Portable Document Format (PDF) and Illustrator renders the graphical elements as a native construct, while other formats render the graphical elements as a raster image.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a graphical element rendering environment 100 in an example implementation that is operable to create graphical elements with rich color diffused appearances. The illustrated environment 100 includes a computing device 102, which may be configured in a variety of ways.

The computing device 102, for instance, may be configured as a desktop, computer, a laptop computer, a mobile device (e.g. assuming a handheld configuration such as a tablet or mobile phone as illustrated), and so forth. Thus, the computing device 102 may range from full resource devices with substantial memory and processor resources (e.g. personal computers, game consoles) to a low-resource device with limited memory and/or processing resources (e.g. mobile devices). Additionally, although a single computing device 102 is shown, the computing device 102 may be representative of a plurality of different devices, such as multiple servers utilized by a business to perform operations "over the cloud" as described in FIG. 15.

The computing device 102 is illustrated as including a graphics rendering application 104. The graphics rendering application 104 is implemented at least partially in hardware of the computing device 102 to diffuse graphical elements 106 with complex color combinations, which is illustrated as maintained in a storage device 108 of computing device 102. The diffused graphical elements 106 are accessible via user interface 110, e.g. by a display device 112 and/or stored in the storage device 108. Although illustrated as implemented locally at the computing device 102, functionality of the graphics editing application 104 may also be implemented in whole or in part through the functionality available via network 118, such as part of a web service or "in the cloud."

Graphical elements 106 may include a myriad of digital content with shapes and topologies designed with or including compound paths, e.g. text 116. A compound path is a feature that has found widespread use in digital rendering applications to design digital content with complex shapes. A compound path includes two or more paths associated with a digital content's shape such that a hollow space may appear where these paths overlap. Digital content designed with a compound path includes the paint and style attributes of the "backmost" layer or surface present in the digital content stacking hierarchy.

Figure 12:
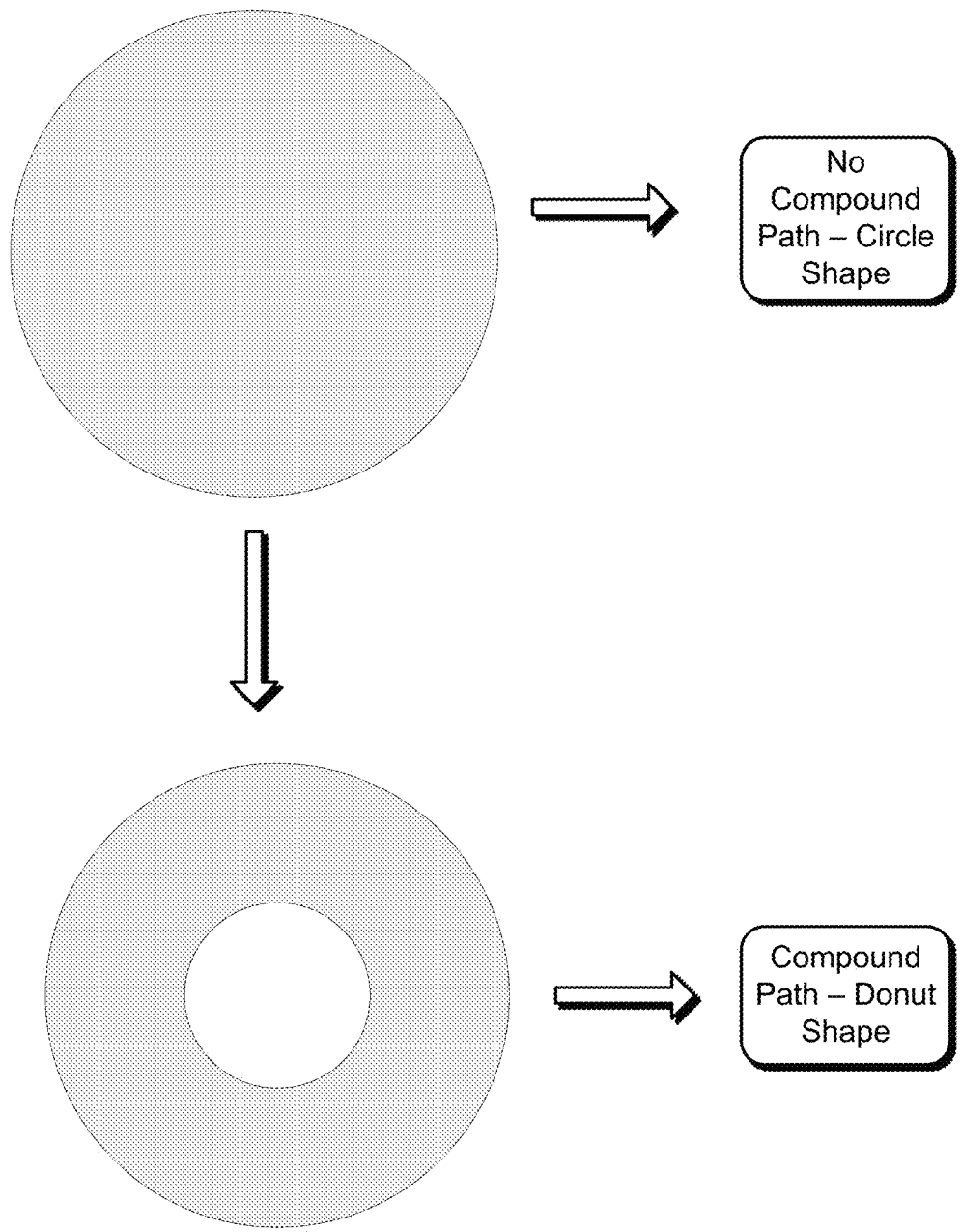
FIG. 12 illustrates an example of digital content designed with the use of compound paths, which is a feature available in a variety of digital rendering applications.

For instance, to create digital content with a donut shape, as depicted in FIG. 12, two concentric circles of varying radii may be designed such that the circle with the smaller radius overlays a portion of the larger circle. The compound path feature can then be used to create a hollow space with the shape properties of the smaller circle on the space previously occupied by the smaller circle, as depicted in FIG. 12. This hollow space may then be edited in a variety of ways, including defining the space with the paint and style attributes of an underlying layer of the digital content. In effect, the properties of the underlying or bottommost layer (e.g. typically a background or grid) appears adjacent to a portion of the circle with the larger radius, thereby creating a donut shape, as depicted in FIG. 12. Common digital content with shapes designed by compound paths include text, which are examples of graphical elements 106 depicted in FIG. 1. Text may be defined using a variety of standards including Scalable Vector Graphics (SVG), Portable Document Format (PDF), Encapsulated PostScript (EPS), Windows Metafile (WMF), Vector Markup Language (VML), and so forth.

As stated above, convention techniques do not support color diffusion within text and other graphical elements (i.e. digital content) because these techniques are not capable of addressing a topology and shape of the graphical elements. Accordingly, the graphical rendering application 104 addresses these and other challenges through use of a graphical element diffusion system 114. The graphical element diffusion system 114 is configured to identify color location data and color identification data associated with a graphical element as specified by a user, e.g., using point handle and curve handle features. From this, the graphical element diffusion system 114 is configured to generate a mesh structure within graphical element boundaries based on a triangulation algorithm, and as such, address a shape of a boundary of the graphical element as well as a topology within the graphical element. From this, the graphical element diffusion system 114 is configured to apply one or more colors to select portions of the mesh structure in accordance with a color weighting calculation. Consequently, compound path shapes in digital content may be effectively diffused with intricate color combinations, which is not possible using conventional techniques.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Graphical Element Color Diffusion

Figure 2:
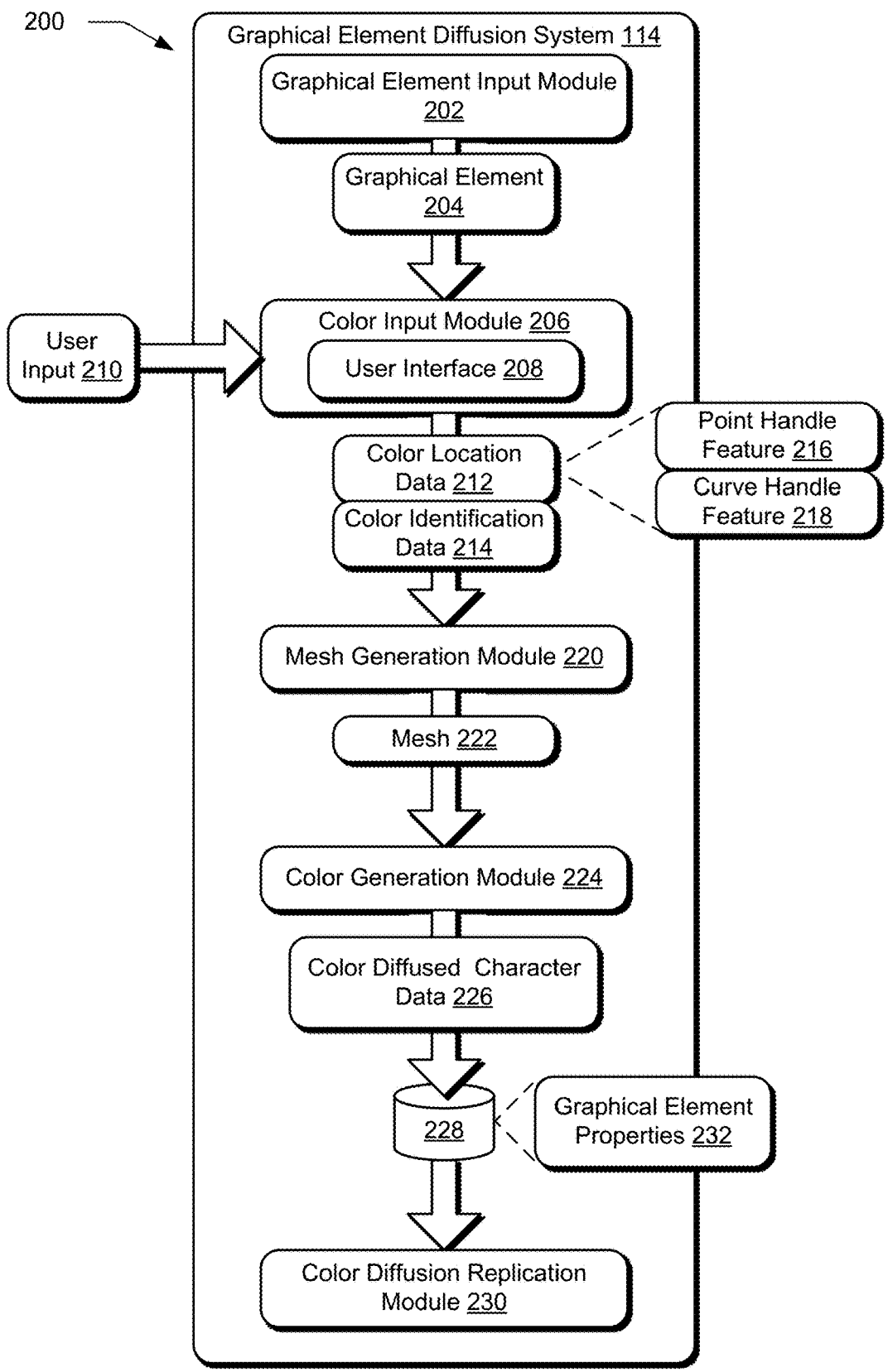
FIG. 2 depicts an example implementation of a graphical element diffusion system showing operation of a graphical element input module, color input module, mesh generation module, color generation module, and a color diffusion replication module in greater detail to support rich color diffusion techniques.
Figure 4:
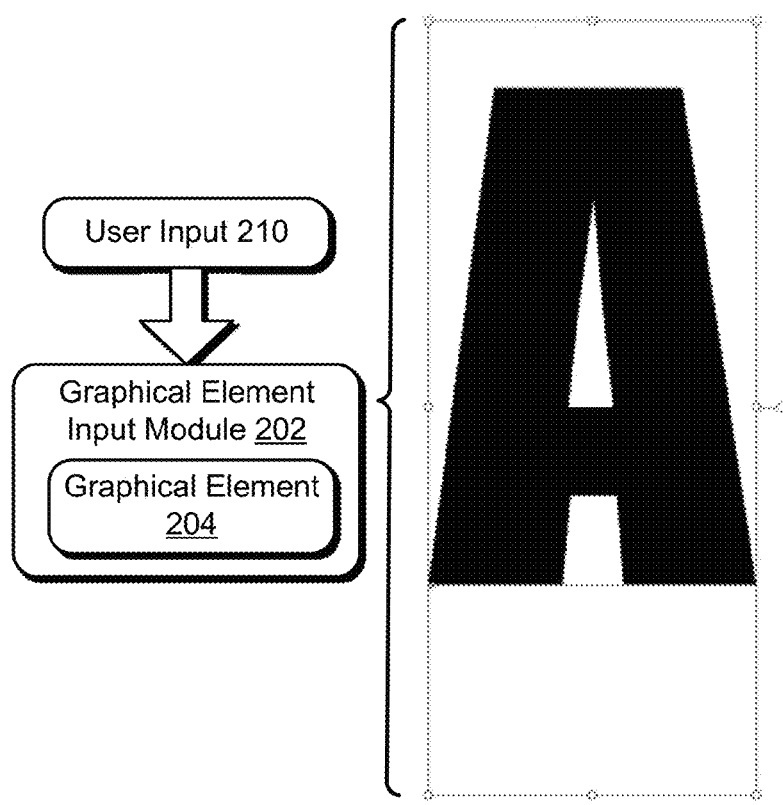
FIG. 4 depicts an example of a user inputting text with the use of the graphical element input module in a graphical element rendering environment.

FIG. 2 depicts a system 200 in an example implementation in which operation of the graphical element diffusion system 114 is shown in greater detail. FIG. 3 depicts a procedure 300 in an example implementation of graphical element color diffusion techniques described herein. The following discussion describes techniques that may be implemented utilizing the described systems and devices.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is made interchangeably to FIGS. 2-14.

Graphical element diffusion system 114, as depicted in detail in FIG. 2, is configured to address the challenges of conventional techniques by supporting diffusion of one or more graphical elements with intricate color combinations. The illustrated example of the graphical element diffusion system 114 includes a graphical element input module 202, via which, user input is received. The received user input causes selection of graphical element 204, e.g. text "A," which appears on a portion of display device 112. Graphical element 204 is depicted in example implementation 400 of FIG. 4. Although text is illustrated as an example, graphical element 204 may take many forms, including shapes in digital content that contain compound paths.

After selection, graphical element 204 is passed to color input module 206. The color input module 206 receives a user input 210, via a user's interaction with user interface 208. Color input module 206 is configured to, based on user input 210, identify first color location data identifying a first location with respect to a first graphical element and first color identification data associating a first color with the first location (block 302). The color location and identification data are then passed from the color input module to mesh generation module 220.

Figure 5A:
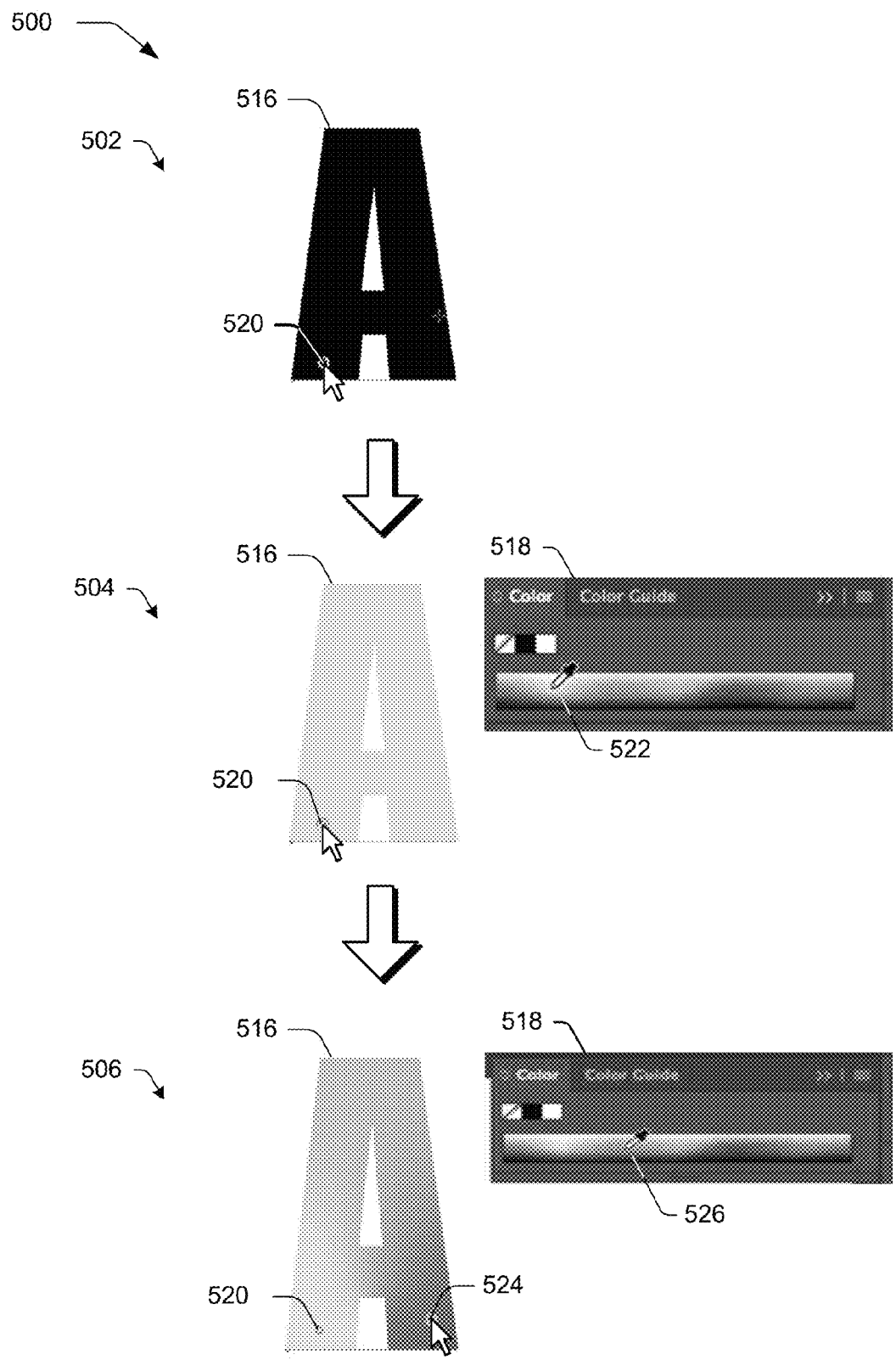
FIG. 5A depicts a graphical element diffusion system in an example implementation showing operation of a color input module that identifies, based on receiving user input, color location data and color identification data within the boundary of text and a color generation module that diffuses colors within the text boundary based on the color location data and color identification data.

FIG. 5A depicts example implementation 500 of a user's interaction with color input module 206 via user interface 208, depicted in FIG. 2, to generate color location data 212 and color identification data 214. Example implementation 500 is illustrated, in part, using first, second and third stages 502, 504, and 506. At the first stage 502, a graphical element as a text character "A" and a menu 518 are illustrated. A user input 210 is received via a cursor control device, gestures, and so forth to first specify a location within a boundary of a graphical element, e.g., the text letter "A." The user input 210, for instance, may employ a point handle feature 216 or a curve handle feature 218, either of which may be chosen from an interactive toolbar displayed on user interface 208. The point handle feature may be represented by a cursor shaped like a small arrow that is movable across user interface 208. After selecting the point handle, e.g. a toolbar, the user moves the arrow shaped cursor over the graphical element and selects a first location 520 within the boundary of the graphical element by clicking on a portion of the element. The identified first location 520 is depicted in the form of a small circle on the bottom-left portion of graphical element 516 "A."

At the second stage 504, color identification data 214 is generated by the color input module 206. To do so, user input 210 is received by color input module 206 to select a color from an interactive color spectrum menu 518 using a color selection tool, e.g., an eyedropper tool. Specifically, a user may select a color by moving the eyedropper tool over the interactive color spectrum menu 518 and "clicking" on a portion of the menu, e.g., through use of a cursor control device. The clicking action completes selection of a color for application to the first location 520 identified within the graphical element boundary at first stage 502. This process may be repeated at various locations within the graphical element. An example of this repetition is illustrated at third stage 506 of FIG. 5A, in which second location 524 and second color 526 are selected in a manner described above. In this way, color location data 212 and color identification data 214 are identified and generated by the color input module 206. This data is then passed to mesh generation module 220.

Figure 6:
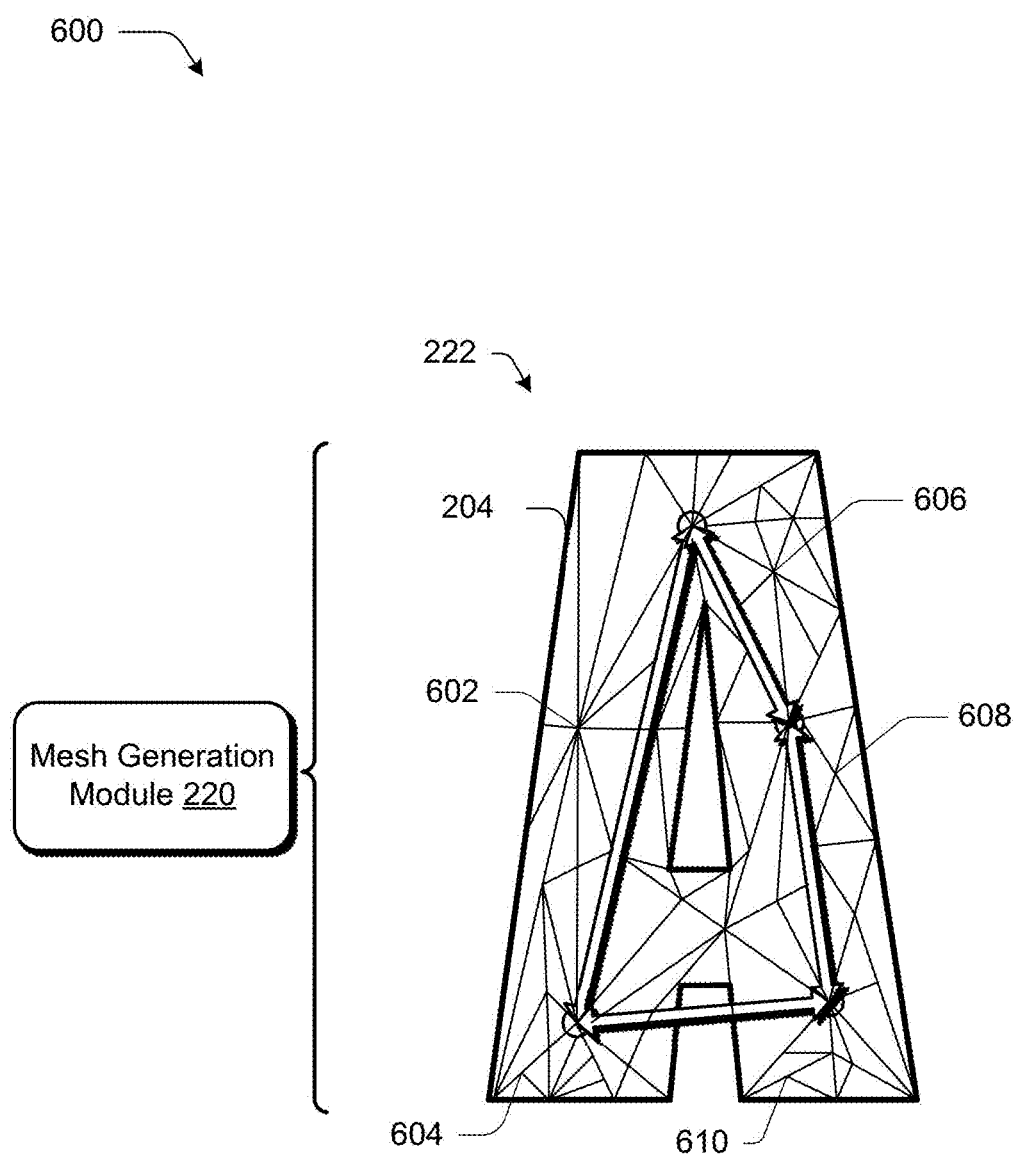
FIG. 6 depicts an example implementation of the generation of a mesh within the boundary of the graphical element with the use of the mesh generation module.

FIG. 6 depicts an example implementation 600 in which mesh generation module 222 generates a mesh in a graphical element based at least in part on a boundary of the graphical element and/or the locations included in the color location data 212. In this example, vertices 602, 604, 606, 608, and 610 are identified by mesh generation module 220 based in part on color location data 212 of the graphical element as specified by a user as further described below. In one example, color location data is transformed and stored by mesh generation module 220 as Steiner points in a storage device (e.g., memory) of computing device 102. Steiner points are configured to determine a shortest connecting network associated with a set of points in a plane—in effect, finding a single point from which the sum of distances to all points of a given set are minimal.

Figure 13:
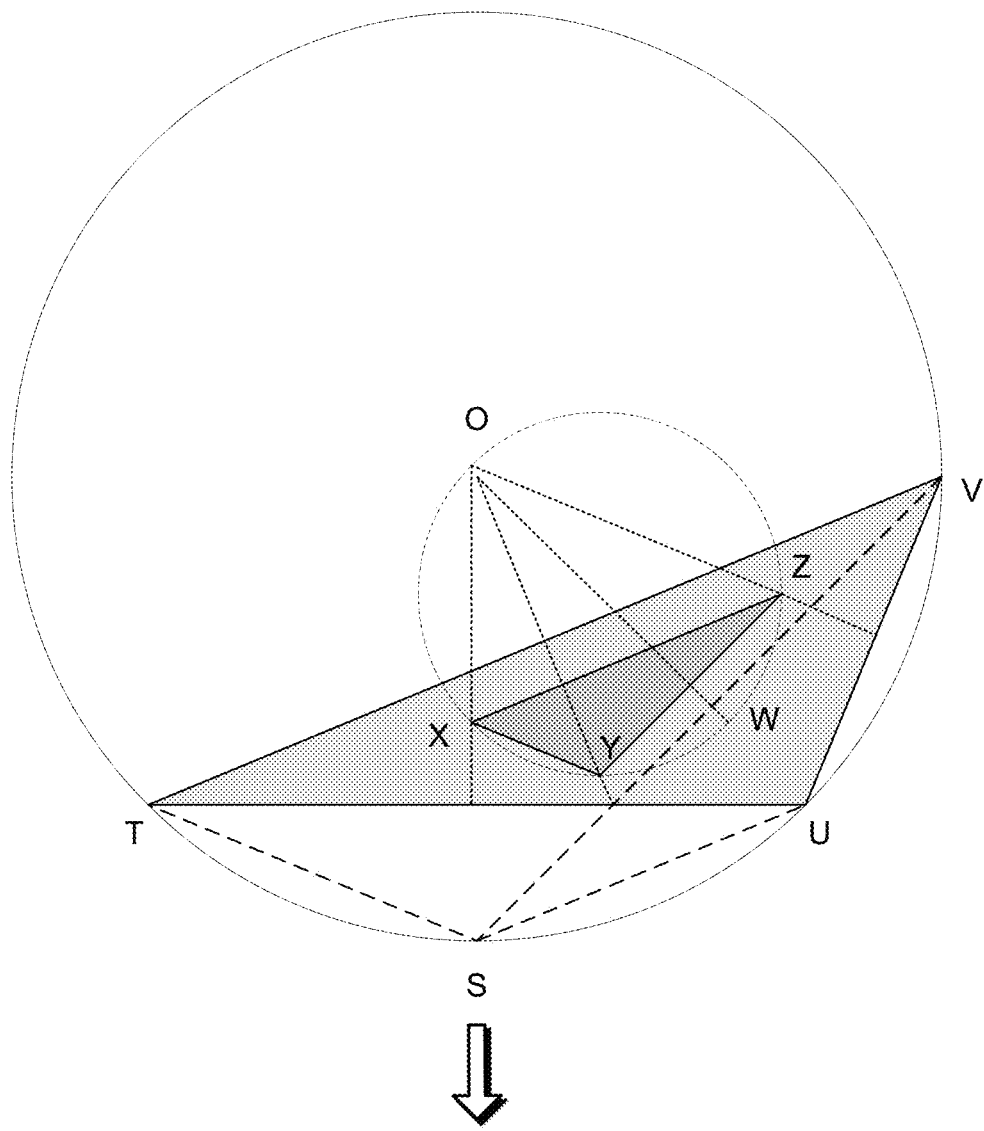
FIG. 13 depicts a graphical representation of steps needed to calculate the Steiner Point of a Triangle.

FIG. 13 depicts an example calculation of Steiner point "S" of a triangle shape "TUV," identified 1302. The first step in this calculation by mesh generation module 220 includes drawing a circle connecting each of the vertices of the triangle "TUV." Next, a Symmedian point "W" within the triangle is calculated by the mesh generation module 220. The Symmedian point is the intersection of geometric lines that are calculated and drawn by the mesh generation module 220 by reflecting a line connecting each vertex of the triangle TUV with the midpoint of the side directly opposite the vertex (i.e. a triangle median) and tracing the intersection point of the reflected lines. Thereafter, another circle is calculated having a diameter that is a straight line drawn from the center point O to the Symmedian point W, and then a smaller triangle XYZ is drawn by the module. Finally, lines parallel to sides XY, YZ, and XZ of the smaller triangle XYZ are drawn by the mesh generation module 220 as originating from the vertices of the larger triangle TUV. The intersection point of these parallel lines is the Steiner point of Triangle TUV—labeled "S" in FIG. 13, identified 1302.

Figure 14:
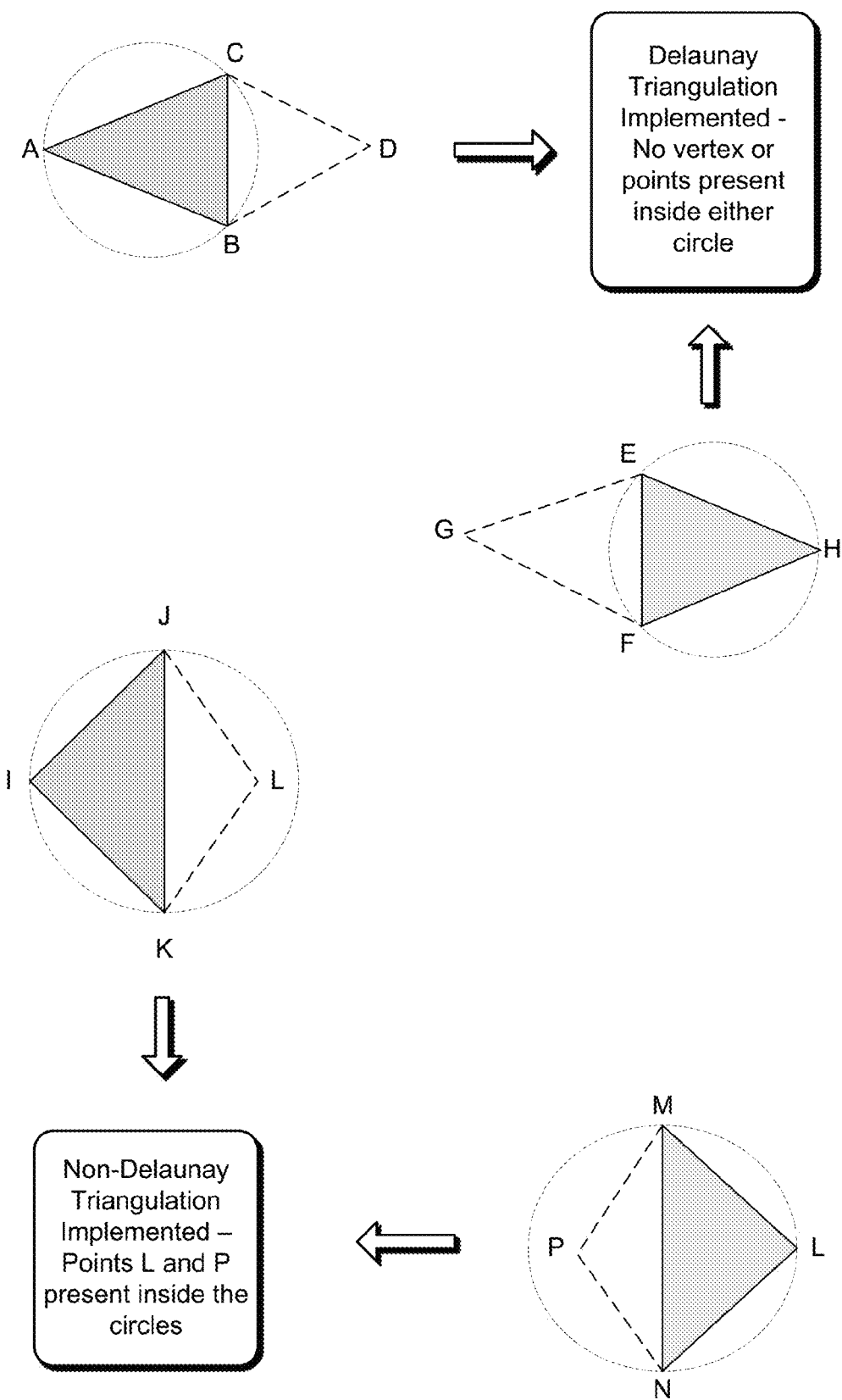
FIG. 14 depicts a graphical representation of the Delaunay Triangulation algorithm implemented on Triangles ABC, DBC, GEF, and HEF.

The stored Steiner points of the color location data within the graphical element boundary is then used by the mesh generation module 220 to generate mesh 222 based on a triangulation algorithm, an example of which includes Delaunay Triangulation as depicted in FIG. 14. A Delaunay triangulation of a set of points in a two-dimensional space ensures that none of the circles that circumscribe the triangles created from these set of points has a point or vertex that falls within the perimeter of the circles. As illustrated, the circle circumscribing triangle "ABC" does not contain any vertices or points in its interior. Similarly, the circle circumscribing triangle HEF also does not contain any vertices or points in its interior. This technique facilitates effective connection of points that are adjacent to one another on a plane, thereby increasing the interpolation accuracy of scattered data. Delaunay Triangulation, implemented on Steiner point conversions of the color location data associated with a graphical element by the mesh generation module 220, results in the mesh 222 (e.g., as a triangle mesh) with vertices 602, 604, 606, 608, and 610 at user-specified locations in the graphical element. In this way, scattered data created by Steiner point conversions of color location data associated with the graphical element are accurately interpolated to form mesh 222, and thus addresses a topology of the graphical element.

After generation of the mesh 222 by mesh generation module 220, color generation module 224 is employed to diffuse colors within the graphical element at select portions of the mesh 222 (block 304) based on a color weighting calculation. Specifically, one or more colors are diffused by color generation module 224 at the vertices of the mesh 222 based on the color weighting calculation such that weights used to specify an amount of color decrease as a distance from the user-specified locations increases.

Figure 5B:
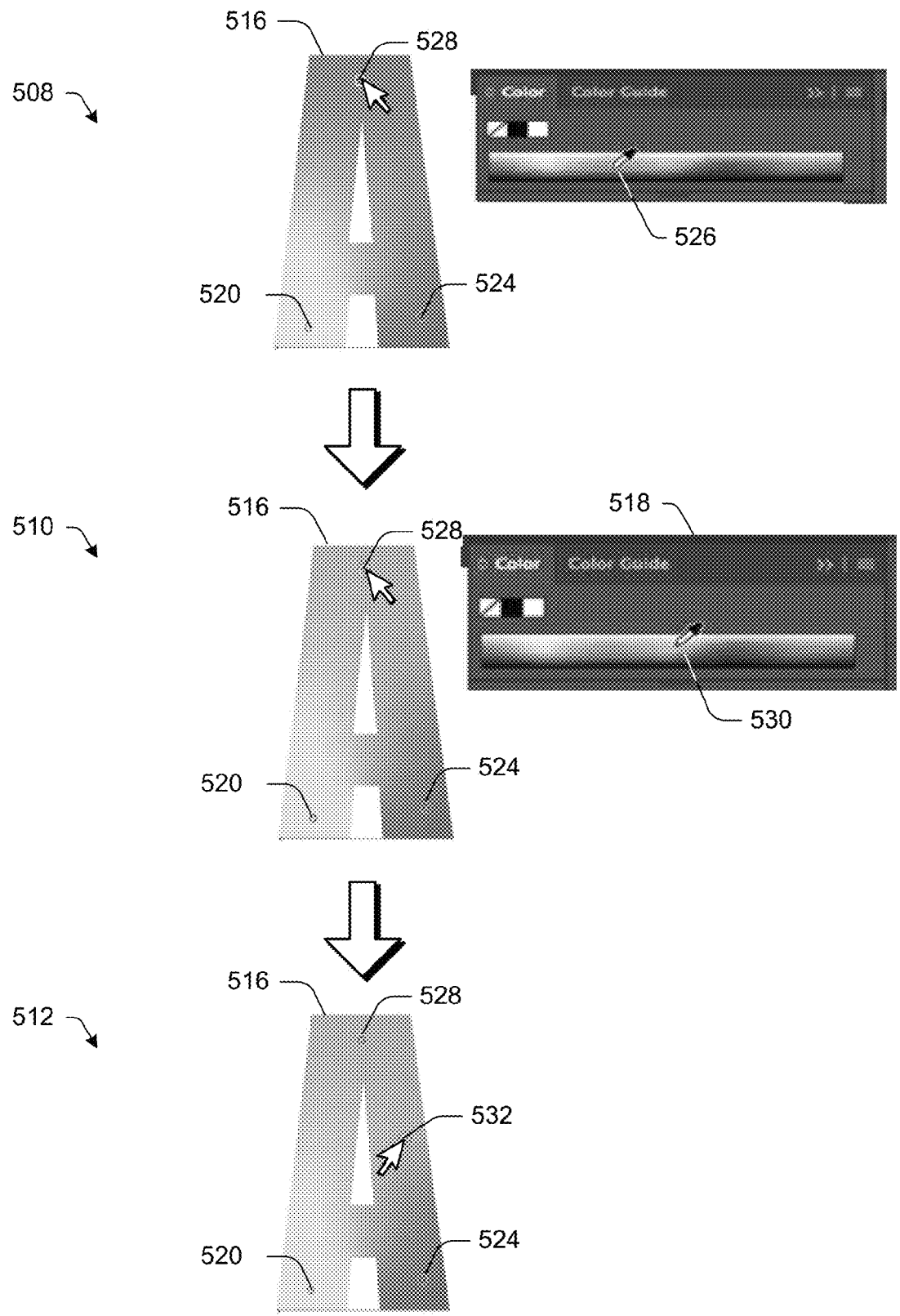
FIGS. 5B & 5C further depict example implementations of color diffusion at multiple locations within the graphical element with the use of the color input module and the color generation module.
Figure 5C:
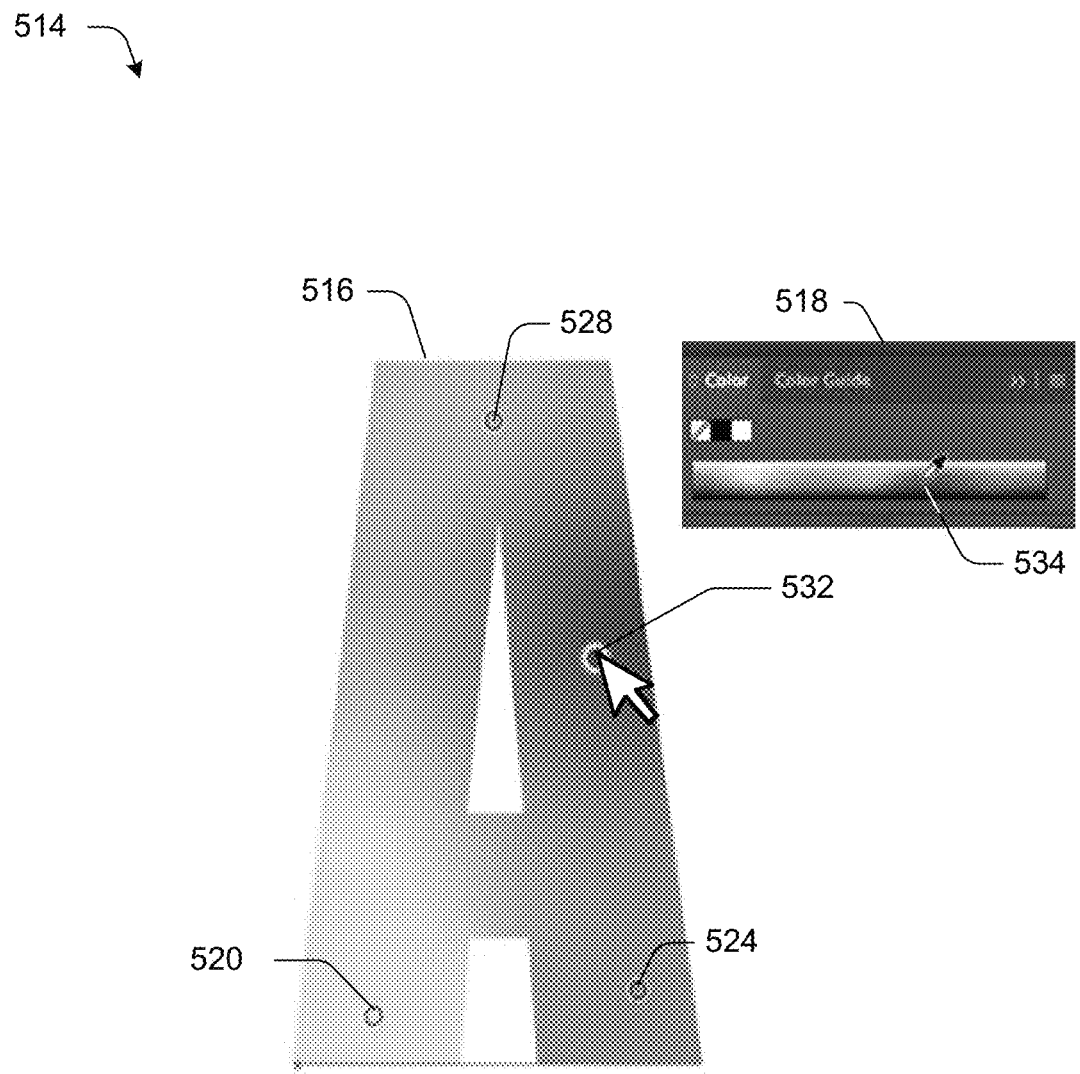

Returning now to FIGS. 5A-5C, having generated the mesh 222, the color diffusion techniques may continue to support real time output of additional colors as diffused within a boundary of the graphical element. As previously described, FIG. 5A is illustrated using first, second, and third stages 502, 504, and 506. Likewise, FIG. 5B is illustrated using fourth, fifth, and sixth stages 508, 510, and 512, and FIG. 5C is illustrated as including a seventh stage 514. At the second stage 504, color generation module 224 applies first color 506 (yellow in the illustrated instance) equally within graphical element 516 at an identified first location 520. This causes the color generation module 224 to diffuse graphical element 516 initially with a uniform yellow color. Thereafter, at the third stage 506, a second location 516 and second color selection 518 are received, which is green in this example. In response the color generation module 224 generates diffused color data 226 based on the first location 508 and corresponding color 512 and the second location 516 and corresponding color 518, which is then rendered by the computing device 102. The result is that graphical element 516 appears diffused with a fusion of yellow and green colors such that both colors appear in varying gradations across the element.

The highest concentration of yellow appears closest to first location 520 and the highest concentration of green appears closest to second location 524. The varying gradations with which the yellow and green colors appear within graphical element 516, e.g. "A," are a result of the diffusion, by the color generation module 224, of colors at select vertices of the mesh 222 according to a color weighting calculation. Mesh 222 is generated based on locations 520 and 524. The color weighting calculation may be implemented in a variety of ways, examples of which include Harmonic, Biharmonic, or Triharmonic techniques.

This process may continue, with color diffusion occurring in real time based on subsequent inputs that specify a location within a graphical element and corresponding color to be applied to the specified location. At fourth stage 508, a third location 528 is specified with respect to the graphical element 516, and color 526, which was previously applied at second location 524 is reselected to be applied to third location 528. This causes color generation module 224 to generate diffused color data 226 in real time, which includes diffusing second color 526 (e.g., green in the illustrated instance) from second location 524. In effect, second color 526 appears near location 528 with a concentration equal to the green color applied in second location 524.

At the fifth stage 510, a third color 530 (blue in the illustrated instance) is selected for application at a third location 528. This causes color generation module 224 to again generate diffused color data 226 in real time, which includes diffusing third color 530 (e.g., blue) from third location 528. As a result, the third color 530 appears with highest concentration near third location 528 and varies in color gradation as the color's diffusion approaches first location 520 and second location 524.

At the sixth stage 512, a fourth location 532 is specified with respect to the graphical element 516, and at the seventh stage 514, a fourth color 526 (e.g., purple) is selected to be applied to the fourth location, causing color generation module 224 to generate diffused color data 226 in real time, which includes diffusion of fourth color 534 from fourth location 532. As a result, fourth color 534 (purple in this illustrated instance) appears with highest concentration near fourth location 532 and varies in color gradation as the color's diffusion approaches second location 524 and third location 528. In this way, user interface 208 supports efficient user interaction in real time in order to facilitate diffusion of graphical elements containing compound paths with intricate color combinations. As previously stated, conventional techniques were ineffective in diffusion graphical elements containing compound paths, e.g. text, with intricate color combinations.

Returning to FIG. 2, after color generation module 224 generates color diffused character data 226 by diffusing a graphical element with colors at one or more identified locations, the character data is stored in storage device 228 of computing device 102. The diffused color data 226, as stored, may be leveraged by graphical element diffusion system 114 in ways that are not possible using conventional techniques. In one such example, the diffused color data 226 is configured such that the graphical element (e.g., text) remains "live." A "live" graphical element is one that supports the editing of one or more graphical element properties associated with the graphical element. For instance, a live graphical element in the form of text permits modification of text properties such as capitalization, small caps, font size, and so forth. This is not possible in conventional techniques, which generate an element as a static digital image. Changing any of the static digital image's property would require generating an entirely different graphical element.

In another example, the diffused color data 226 is employed by color diffusion replication module 230 to replicate the diffused color, automatically and without user intervention, for other graphical elements specified by a user. For example, after color diffusion of a first graphical element is completed, as illustrated in FIGS. 5A-5C above, a second graphical element is diffused, automatically and without user intervention, with colors based on the color location data and color identification data of a first graphical element. The technique of automatic replication of diffused color, as implemented by the color diffusion replication module 230, includes mapping color diffused character data of a graphical element with respect to a boundary of other graphical elements. Color diffused character data mapping can be done using a variety of mapping techniques, including the rejection technique, nearest compound path approximate technique, equi-distant technique, and machine learning technique.

Figure 7:
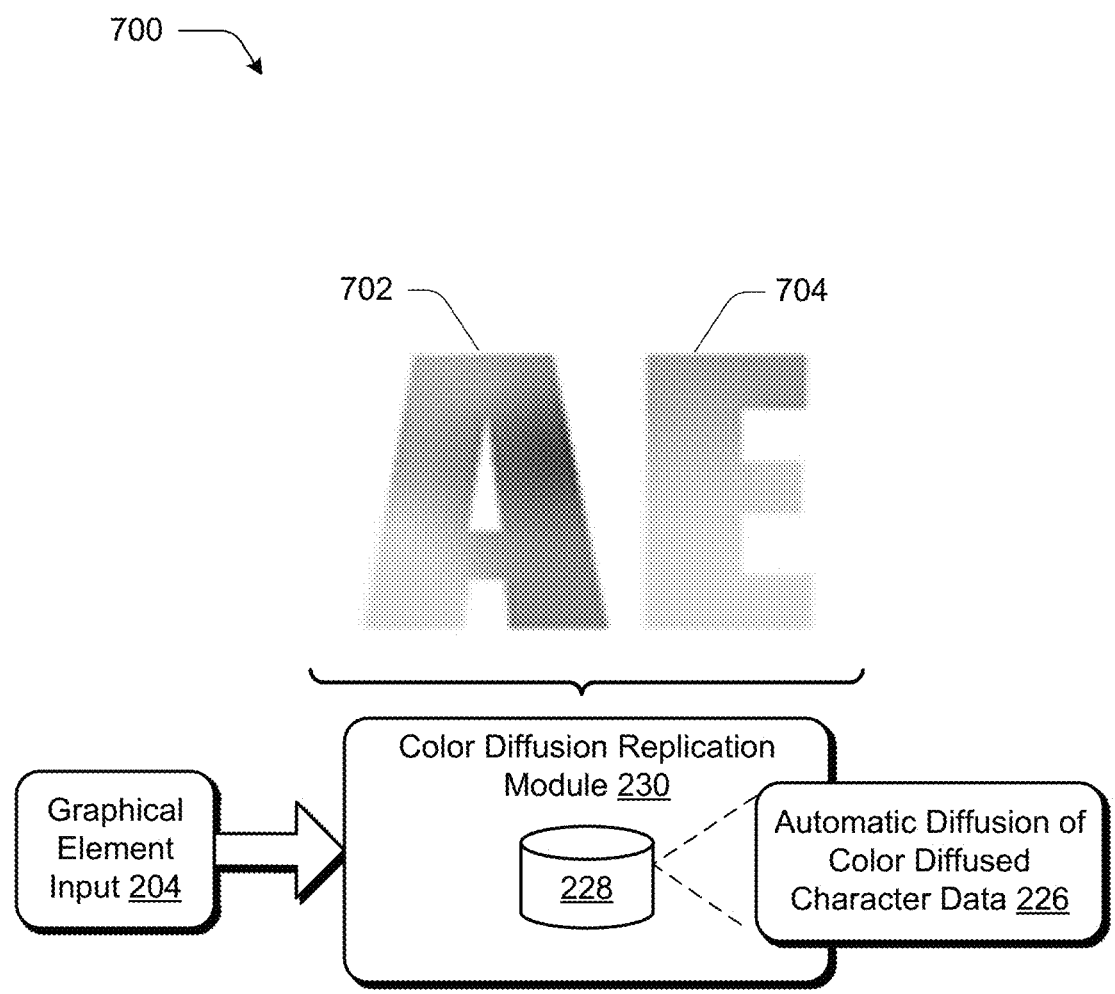
FIG. 7 depicts an example implementation of the diffusion, automatically and without user intervention, of colors in subsequently selected graphical element.

FIG. 7 depicts an example implementation 700 in which color diffusion replication module 230 diffuses, automatically and without user intervention, the color diffused character data 226 of a graphical element 702 on another graphical element 704. Graphical element 702 "A" may be configured to include diffused color as described in the previous example to generate color diffused character data 228. After this, another user input may be received to select the second graphical element 704 ("E" in the illustrated instance) (block 306). From this, color diffusion replication module 230 diffuses, automatically and without user intervention, the color diffused character data 228 of element "A" onto element "E" (block 308). Finally, the diffused first and second graphical elements are displayed (block 310) within the user interface 208. Automatic diffusion, as implemented by color diffusion replication module 230, may be implemented using a wide variety of mapping techniques, an example of which is referred to as a rejection technique, which is further described as follows.

Figure 8:
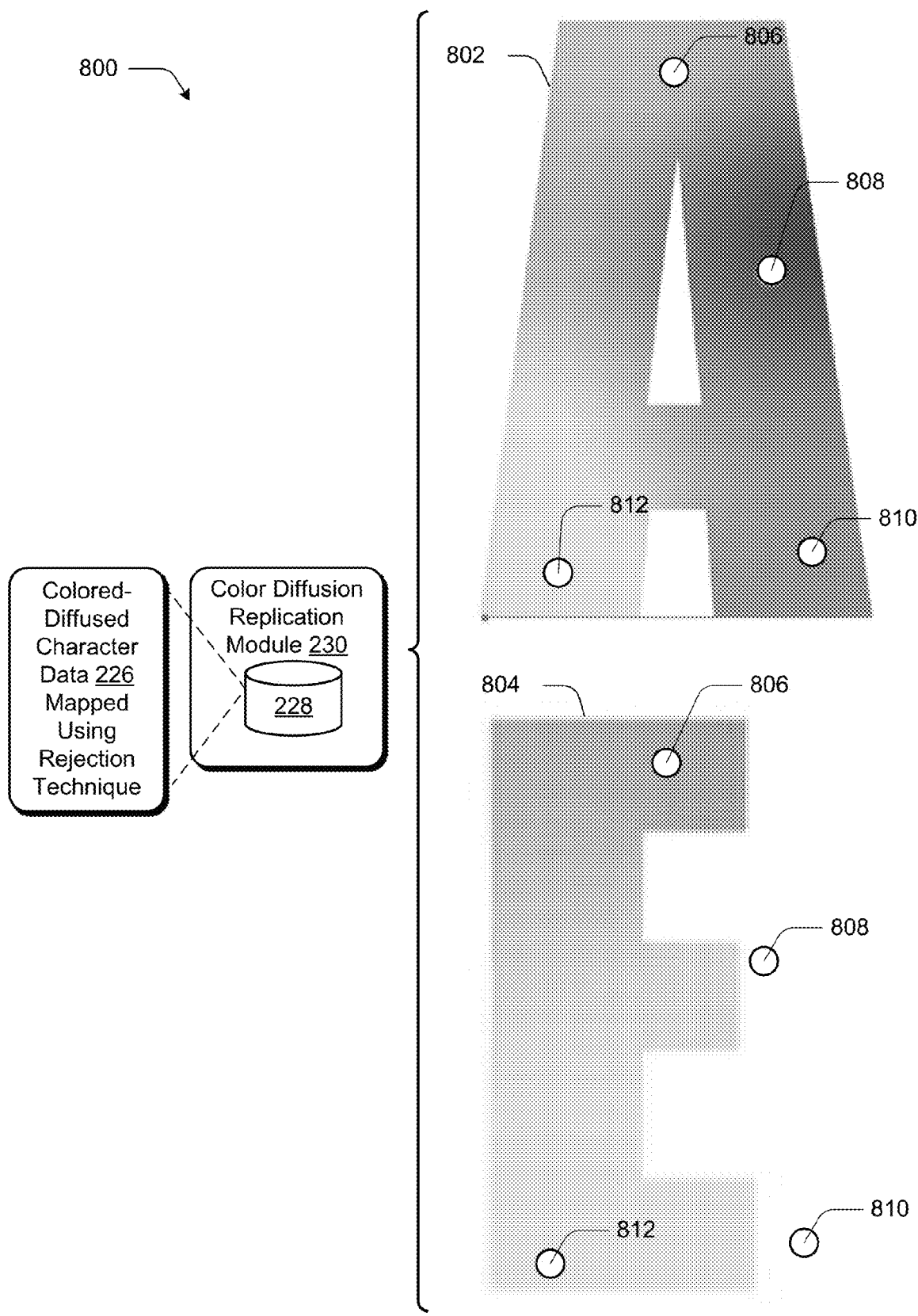
FIG. 8 depicts an example implementation in which color is not diffused on a location outside of a graphical element boundary.

FIG. 8 depicts an example implementation 800 of a rejection technique of mapping applied to element "E," based on the color diffused character data associated with element "A." This implementation 800 is illustrated using first and second stages 802 and 804. At the first stage 802, the color diffusion replication module 230 maps the color location data of element "A," depicted in the form of small circular location markers 806, 808, and 810, on the outline of element "E." From this, the color diffusion replication module then identifies color location data associated with markers 808 and 810 as being mapped outside the boundary of element "E."

At stage 804, color diffusion replication module diffuses colors at the locations mapped within the boundary of element "E"—represented by markers 806 and 812, but not from locations "outside" of the boundary as identified above, e.g., markers 808, 810. The colors diffused at markers 806 and 812 mapped onto element "E" correspond to the colors that are diffused at the same location markers in element "A." Specifically, as blue and yellow colors were the diffused at each of location markers 806 and 812 within element "A," these same colors are diffused at each of markers 806 and 812 in element "E." However, as location markers 808 and 810 are identified as mapped outside element E's boundary, color diffusion replication module 230 does not apply green and purple colors at these locations. In other words, element "A" is diffused with yellow, green, blue, and purple colors, while element "E" is diffused solely with yellow and blue colors. While the rejection method of mapping is described in FIG. 8, other mapping techniques including nearest compound path approximation technique, equi-distant technique, and a machine learning technique, any or all of which may be used by color diffusion replication module 230 to automatically diffuse color diffused character data on graphical elements.

Per the nearest compound path approximation technique, each of the location markers that fall outside an element's boundary are mapped to the nearest perpendicular distance within the element's boundary. In the equi-distant technique, the location markers from the first graphical element may be mapped within and along the boundaries of subsequently selected graphical elements such that each location marker is spaced an equal distance from all location markers within the elements. Finally, a machine learning methodology may be utilized, by which, user input and editing information related to a graphical element may be tracked, analyzed, stored, and used to train the text diffusion system to diffuse subsequently selected elements in accordance with a calculated algorithm.

Figure 9:
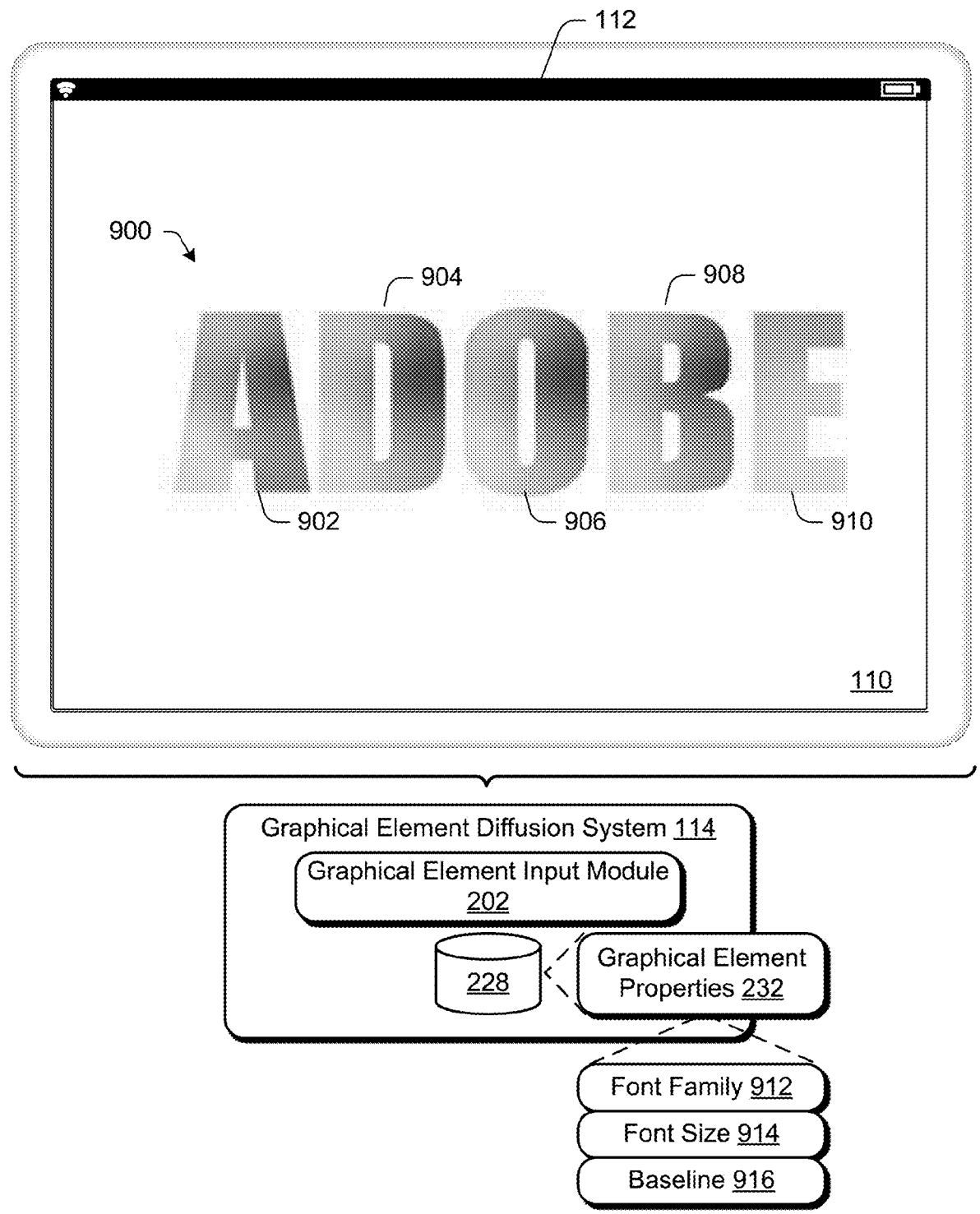
FIG. 9 depicts an example implementation of a graphical element diffusion system in which a storing module stores a plurality of graphical elements properties including font family, font size, and baseline, each of which may be changed by the user with the use of the graphical element input module.

FIG. 9 depicts an example implementation 900 in which a user can access and change graphical element properties associated with various graphical elements using graphical element input module 202. In this example, graphical elements 902, 904, 906, 908, and 910 are rendered in a user interface 110. Each of these graphical elements include graphical element properties that are stored in storage device 228 of computing device 102. These properties can be accessed and changed by graphical element input module 202 before, during, and after color diffusion. Illustrated examples of graphical element properties 232 include font family 912, font size 914, and baseline 916. Other examples of graphical element properties are also contemplated, including kerning. Font family 912 is associated with the style of the graphical elements—namely a design of the shapes and curves that form each of the graphical elements. Font size 914 relates to length, width, and height of each of the elements, and baseline 916 refers to a virtual line upon which the bottommost portion of the graphical elements are displayed. The bottommost portion may be adjustable such that the bottommost portions of graphical elements may appear stretched and far away from the top of the elements or appear contracted and close to the top of the elements. Finally, kerning refers to adjusting the space between graphical elements.

Figure 10:
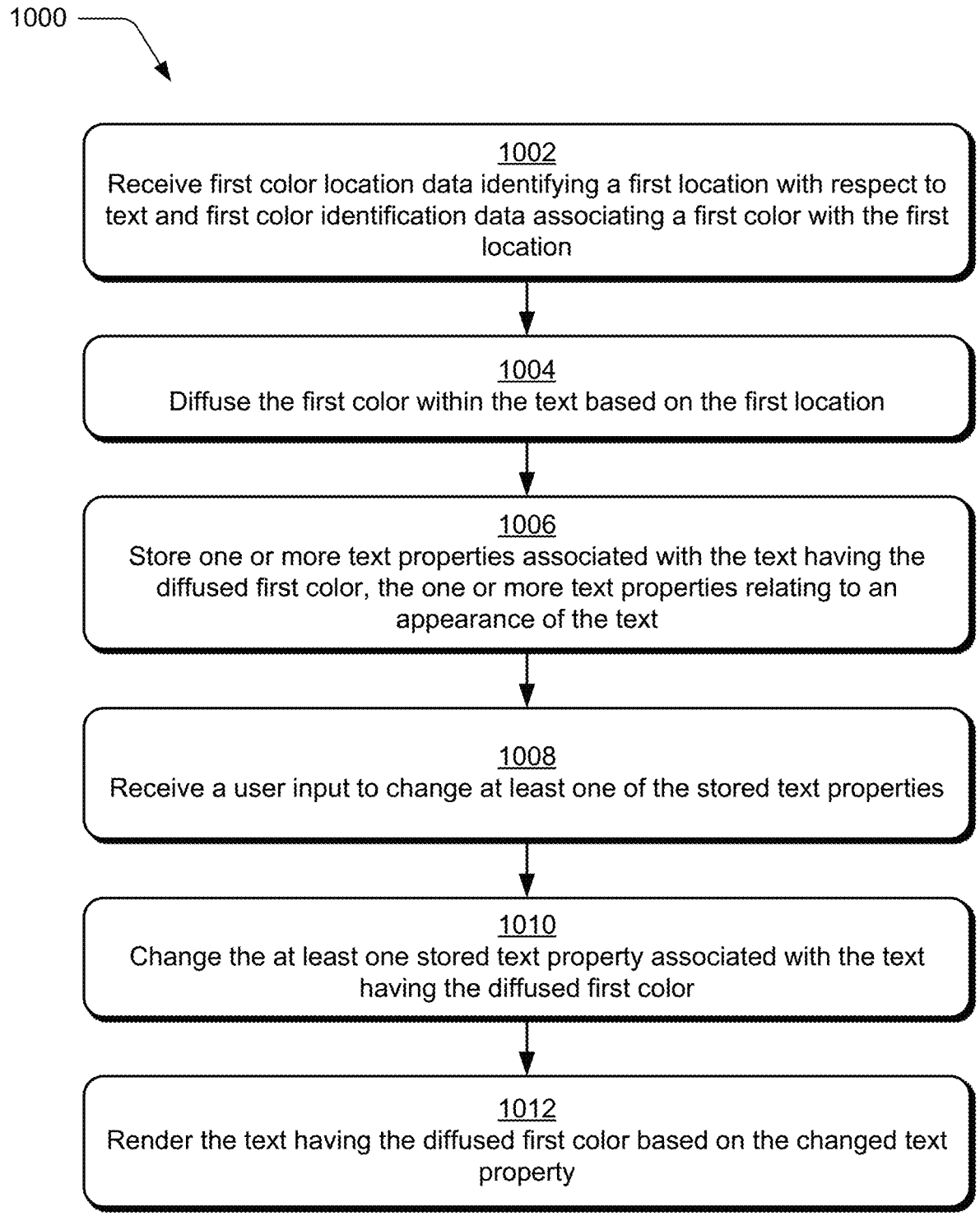
FIG. 10 is a flow diagram depicting a procedure in an example implementation of color diffusion of text in a graphical element rendering environment, changing at least one stored text property associated with color diffused text, and rendering subsequently selected text with both the diffused colors and the changed text property.

FIG. 10 depicts procedure 1000 in an example implementation of graphical element color diffusion techniques described above are implemented on graphical elements, e.g. text, and at least one property associated with the text is changed. In this way, text may be diffused with intricate color combinations and will remain "live," before, during, and after color diffusion. Initially, first color location data identifying a first location with respect to text and first color identification data associating a first color with the first location of the text are both received via user input 210, executed through user interface 208 of a computing device (block 1002). As described above, identification of the first color location data and first color identification data is performed by color input module 206.

The color location data 212 and color identification data 214 are then passed to a mesh generation module 220, which generates a mesh 222 within a boundary of respective characters of the text and identifies vertices at selection portions of the mesh. Thereafter, the first color is diffused within the text, by color generation module 224, based on the first identified location (block 1004). Color diffusion performed by color generation module 224 includes diffusion of colors within the text at the generated vertices of the triangle mesh according to a color weighting calculation. The resulting color diffused character data 226 of the text is stored in storage device 228 of computing device 102.

Additionally one or more text properties associated with the diffused text are also stored in storage device 228 (block 1006). Graphical element input module 202 may receive, via user interface 208, an input from a user to change or more of these text properties (1008), and change one or more of these text properties according to the received user input (1010). A user may change text properties using a variety of features, including interacting with a tool bar displayed on user interface 110 that contains one or more text properties as icons or entries within a "drop-down" menu and changing one or more of these associated text properties. A user, for instance, may select a letter of text and desire to capitalize it. In response, the graphical element diffusion system 114 may remap the locations and colors to the graphical element having the changed text property (e.g., a capitalized letter) to render the text as having the diffused color (block 1012).

Figure 11:
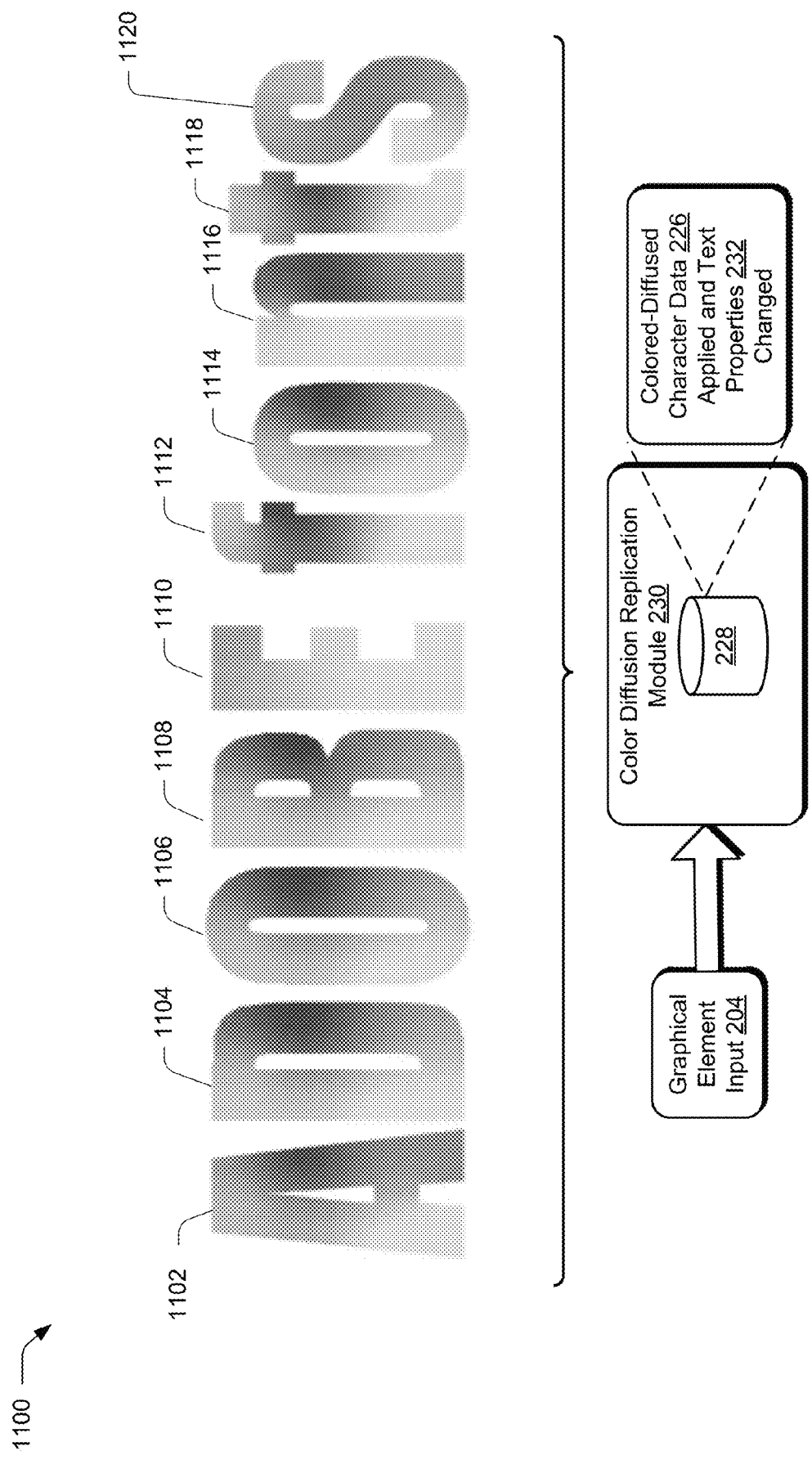
FIG. 11 depicts an example implementation in which a color diffusion replication module, automatically and without user input, diffuses color to text subsequently input by the user.

FIG. 11 depicts an example implementation 1100 in which text 1102 has been diffused with color diffused character data 226 by the color diffusion replication module 230, and at one or more text properties 232 associated with the displayed text has been changed by graphical element input module 202. In this example, ten text items are included in user interface 208. After text item 1102 (text "A" in the illustrated instance) has been diffused with multiple colors as described above and depicted in FIGS. 5A-5C, the color diffused character data of text item 1102 is saved in storage device 228 of computing device 102. Thereafter, a user input is received by graphical element input module 202, which generates text items 1104-1120, each of which are diffused by mapping the color diffused character data of text item 1102.

Moreover, graphical element input module 202 may also receive further input, by which capitalization of text items 1102-1120 is changed. Specifically text items 1102-1110 are capitalized and text items 1112-1120 are not. In this way, graphical element diffusion system 114 can be used to both diffuse text with intricate color combinations and change at least one text property such that the text remains "live." As such, graphical diffusion system 114 supports intricate color diffusion of live graphical elements, which is not possible using conventional techniques.

Example System and Device

Figure 15:
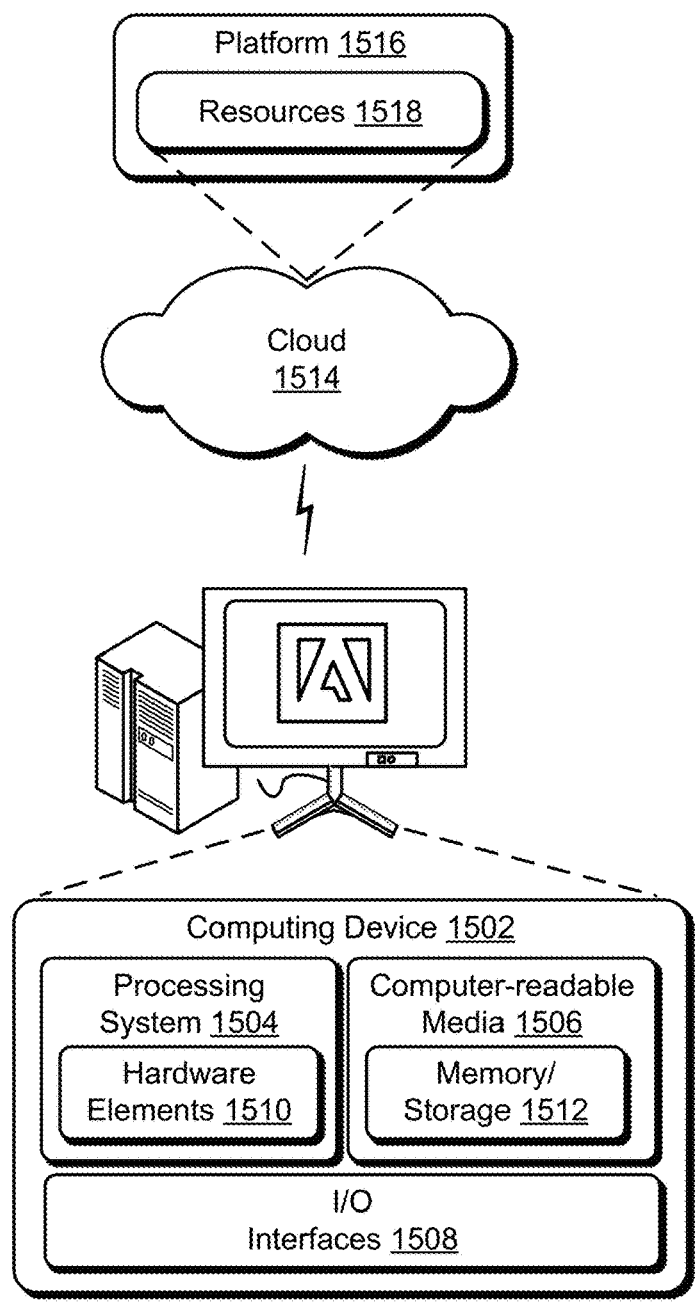
FIG. 15 illustrates an example system including various components of an example device that can be implemented as any type of computing device as described and/or utilized with references to FIGS. 1-14 to implement embodiments of the techniques described herein.

FIG. 15 illustrates an example system generally at 1500 that includes an example computing device 1502 that is representative of one or more computing systems and/or devices that may implement the various techniques described herein. This is illustrated through the inclusion of graphics rendering application 104. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources

1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

Conclusion

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

The invention claimed is:

1. In a digital medium graphical element rendering environment, a method implemented by a computing device, the method comprising:
   receiving, via a user interface of the computing device, first color location data identifying a first location within a boundary of a first graphical element and first color identification data of a first color;
   diffusing, by the computing device, the first color within the first graphical element based on the first location;
   receiving, via the user interface of the computing device, second color location data identifying a second location within the boundary of the first graphical element and second color identification data of a second color;
   diffusing based on the second location, by the computing device, the second color within the first graphical element including the diffused first color;
   receiving, via the user interface of the computing device, a user input selecting a second graphical element;
   diffusing, automatically and without user intervention by the computing device, the first and second colors within the second graphical element based on mapping the first color location data and the second color location data within the boundary of the first graphical element with respect to a boundary of the second graphical element;
   displaying, in the user interface by the computing device, the first and second graphical elements as having the diffused first and second colors;
   receiving, via the user interface of the computing device, an additional user input selecting a third graphical element;
   diffusing, automatically and without user intervention by the computing device, the first color based on the mapping of the first color location data with respect to the third graphical element being within a boundary of the third graphical element and not diffusing the second color based on the mapping of the second color location data with respect to the third graphical element being outside the boundary of the third graphical element; and
   displaying, in the user interface of the computing device, the third graphical element as having the diffused first color and not the diffused second color.

2. The method as described in claim 1, further comprising generating, by the computing device, a mesh within the boundary of the first graphical element based on the first color location data, the first color identification data, the second color location data, and the second color identification data, wherein the diffusing of the first and second colors within the first graphical element is based on the mesh.

3. The method as described in claim 2, wherein generating the mesh within the boundary of the first graphical element includes creating vertices at predefined areas within the boundary of the first graphical element based on the identified first and second locations.

4. The method as described in claim 3, wherein the diffusing of the first and second colors within the first graphical element includes:
   calculating a color weighting based on the first and second locations within the boundary of the first graphical element; and
   applying the first and second colors to the vertices at the predefined areas within the boundary of the first graphical element according to the color weighting.

5. The method as described in claim 1, further comprising associating the first color with the first location with respect to the first graphical element and the second color with the second location with respect to the first graphical element.

6. The method as described in claim 1, wherein the first graphical element and the second graphical element are text.

7. The method as described in claim 1, wherein the first and second locations are specified using either a point handle or a curve handle feature.

8. The method as described in claim 1, wherein the first color identification data and the second color identification data are generated via user selections from a color spectrum in the user interface.

9. The method as described in claim 1, wherein the identified first and second colors are not applied outside a boundary of the first graphical element.

10. The method as described in claim 1, further including:
    storing a plurality of graphical element properties associated with the first and second graphical elements, the graphical element properties including font family, font size, kerning, or a baseline; and
    responsive to receipt of a user input, changing at least one of the graphical element properties for the first or second graphical elements having the diffused first and second colors.

11. In a digital medium graphical element rendering environment, a system comprising:
    a processing system; and
    a computer-readable storage medium having instructions stored thereon that, responsive to execution by the processing system, causes the processing system to perform operations including:
       receiving, via a user interface, first color location data identifying a first location within a boundary of a first graphical element and first color identification data of a first color;
       diffusing the first color within the first graphical element based on the first location;
       receiving, via the user interface, second color location data identifying a second location within the boundary of the first graphical element and second color identification data of a second color;

diffusing based on the second location the second color within the first graphical element including the diffused first color;

receiving, via the user interface, a user input selecting a second graphical element;

diffusing, automatically and without user intervention, the first and second colors within the second graphical element based on mapping the first color location data and the second color location data within the boundary of the first graphical element with respect to a boundary of the second graphical element;

displaying, in the user interface, the first and second graphical elements as having the diffused first and second colors;

receiving, via the user interface, an additional user input selecting a third graphical element;

diffusing, automatically and without user intervention, the first color based on the mapping of the first color location data with respect to the third graphical element being within a boundary of the third graphical element and not diffusing the second color based on the mapping of the second color location data with respect to the third graphical element being outside the boundary of the third graphical element; and displaying, in the user interface, the third graphical element as having the diffused first color and not the diffused second color.

12. The system as described in claim 11, the operations further comprising generating a mesh within the boundary of the first graphical element based on the first color location data, the first color identification data, the second color location data, and the second color identification data, wherein the diffusing of the first and second colors within the first graphical element is based on the mesh.

13. The system as described in claim 12, wherein generating the mesh within the boundary of the first graphical element includes creating vertices at predefined areas within the boundary of the first graphical element based on the identified first and second locations.

14. The system as described in claim 13, wherein the diffusing of the first and second colors within the first graphical element includes:
calculating a color weighting based on the first and second locations within the boundary of the first graphical element; and
applying the first and second colors to the vertices at the predefined areas within the boundary of the first graphical element according to the color weighting.

15. The system as described in claim 11, the operations further comprising associating the first color with the first location with respect to the first graphical element and the second color with the second location with respect to the first graphical element.

16. The system as described in claim 11, wherein the first graphical element and the second graphical element are text.

17. The system as described in claim 11, wherein the first and second locations are specified using either a point handle or a curve handle feature.

18. The system as described in claim 11, wherein the first color identification data and the second color identification data are generated via user selections from a color spectrum in the user interface.

19. The system as described in claim 11, wherein the identified first and second colors are not applied outside a boundary of the first graphical element.

20. One or more computer-readable storage medium having instructions stored thereon that, responsive to execution by a processing system, causes the processing system to perform operations including:
receiving, via a user interface, first color location data identifying a first location within a boundary of a first graphical element and first color identification data of a first color;
diffusing the first color within the first graphical element based on the first location;
receiving, via the user interface, second color location data identifying a second location within the boundary of the first graphical element and second color identification data of a second color;
diffusing based on the second location the second color within the first graphical element including the diffused first color;
receiving, via the user interface, a user input selecting a second graphical element;
diffusing, automatically and without user intervention, the first and second colors within the second graphical element based on mapping the first color location data and the second color location data within the boundary of the first graphical element with respect to a boundary of the second graphical element;
displaying, in the user interface, the first and second graphical elements as having the diffused first and second colors;
receiving, via the user interface, an additional user input selecting a third graphical element;
diffusing, automatically and without user intervention, the first color based on the mapping of the first color location data with respect to the third graphical element being within a boundary of the third graphical element and not diffusing the second color based on the mapping of the second color location data with respect to the third graphical element being outside the boundary of the third graphical element; and
displaying, in the user interface, the third graphical element as having the diffused first color and not the diffused second color.

* * * * *